(12) United States Patent
Wallis

(10) Patent No.: US 6,230,101 B1
(45) Date of Patent: May 8, 2001

(54) SIMULATION METHOD AND APPARATUS (75) Inventor: John R. Wallis, Sugar Land, TX (US)

(73) Assignee: Schlumberger Technology Corporation, Houston, TX (US)

(*) Notice: Subject to any disclaimer, the term of this patent is extended or adjusted under 35 U.S.C. 154(b) by 0 days.

(21) Appl. No.: 09/325,170

(22) Filed: Jun. 3, 1999

(51) Int. Cl.[7] ................................................. G06F 17/17
(52) U.S. Cl. ............................................. 702/16; 702/14
(58) Field of Search .......................... 702/16, 14; 367/73

(56) References Cited

U.S. PATENT DOCUMENTS

| | | | |
|---|---|---|---|
| 5,222,202 | * 6/1993 | Koyamada | 395/123 |
| 5,532,976 | * 7/1996 | Schneider, Jr. | 367/38 |
| 5,583,825 | * 12/1996 | Carrazzone | 367/31 |
| 5,729,451 | 3/1998 | Gibbs et al. | 702/14 |
| 6,018,497 | * 1/2000 | Gunasekera | 367/72 |
| 6,061,301 | 5/2000 | Corrigan | 367/75 |

FOREIGN PATENT DOCUMENTS

| | | | |
|---|---|---|---|
| 2217014 | * 10/1989 | (GB) | G01V/1/36 |
| 2247751 | * 3/1992 | (GB) | G01V/1/36 |

OTHER PUBLICATIONS

SPE 12259 "Enhancements to the Strongly Coupled, Fully Implicit Well Model; Wellbore Crossflow Modeling and Collective Well Control" by J.A. Holmes, 1983.

SPE 28545 "Tacite: A Transient tool for Muliphase Pipeline and Well Simulation" by C. L. Pauchon et al, 1994.

SPE 29,125 "Surface Network and Well Tubinghead Pressure Constraints in Compositional Simulation" by M. L. Litvak and B. L. Darlow, Feb. 12–15, 1995.

* cited by examiner

*Primary Examiner*—Christine Oda
*Assistant Examiner*—Victor J. Taylor
(74) *Attorney, Agent, or Firm*—John H Bouchard (57) ABSTRACT

A Linear Solver method and apparatus, embodied in a Simulator and adapted for solving systems of non-linear partial differential equations and systems of linear equations representing physical characteristics of an oil and/or gas reservoir, includes receiving a first signal representing physical characteristics of a reservoir, obtaining a residual vector $\vec{r}_0$ from the first signal (representing errors associated with a system of nonlinear equations describing the reservoir) and a first matrix $A_0$ (representing the sensitivity of the residual vector to changes in a system of nonlinear equations), recursively decomposing matrix $A_0$ into a lower block triangular matrix, an upper block triangular matrix, and a diagonal matrix, and generating a second matrix $M_0$ that is an approximation to matrix $A_0$. A solution to the systems of non-linear partial differential equations may then be found by using certain values that were used to produce the matrix $M_0$, and that solution does not require the direct computation of $A_0 \vec{x} = \vec{b}$ (representing the system of linear equations) as required by conventional methods.

21 Claims, 10 Drawing Sheets

SIMULATION METHOD AND APPARATUS

BACKGROUND OF THE INVENTION

The subject matter of the present invention relates to a simulator software method and apparatus, embodied in an earth formation reservoir simulator, for simulating an earth formation reservoir containing liquids and/or gases by solving a system of linear equations that characterize physical aspects of an oil and/or gas field, the amount of time required by the reservoir simulator to solve the system of linear equations and to thereby simulate the earth formation reservoir being reduced relative to prior art simulation methods practiced by prior art simulators.

Oil and gas is produced from underground rock formations. These rocks are porous, just like a sponge, and they are filled with fluid, usually water. This porous characteristic of rocks is known as porosity. These rocks in addition to being porous have the ability to allow fluids to flow through the pores, a characteristic measured by a property called permeability. When oil (or gas) is trapped in such formations, it may be possible to extract it by drilling wells that tap into the formation. As long as the pressure in the well is lower than that in the rock formation, the fluids contained in the pores will flow into the well. These fluids may then flow naturally up the well to the surface, or the flow up the well may have to be assisted by pumps. The relative amounts of oil, gas and water that are produced at the surface will depend on the fraction of the rock pore space that is occupied by each type of fluid. Water is always present in the pores, but it will not flow unless its volume fraction exceeds a threshold value that varies from one type of rock to another. Similarly, oil and gas will only flow as long as their volume fractions exceed their own thresholds.

The characteristics of the rock (including porosity and permeability) in an oil reservoir vary greatly from one location to another. As a result, the relative amounts of oil, gas and water that can be produced will also vary from reservoir to reservoir. These variations make it difficult to simply predict the amount of fluids and gases a reservoir will produce and the amount of resources it will require to produce from a particular reservoir. However, the parties interested in producing from a reservoir need to project the production of the reservoir with some accuracy in order to determine the feasibility of producing from that reservoir. Therefore, in order to accurately forecast production rates from all of the wells in a reservoir, it is necessary to build a detailed mathematical model of the reservoir's geology and geometry.

A large amount of research has been focused on the development of reservoir simulation tools. These tools include mathematical and computer models that describe and which are used to predict, the multiphase flow of oil and gas within a three dimensional underground formation (a "field"). Reservoir tools use empirically acquired data to describe a field. These data are combined with and manipulated by mathematical models whose output describes specified characteristics of the field at a future time and in terms of measurable quantities such as the production or injection rates of individual wells and groups of wells, the bottom hole or tubing head pressure at each well, and the distribution of pressure and fluid phases within the reservoir.

The mathematical model of a reservoir is typically done by dividing the reservoir volume into a large number of interconnected cells and estimating the average permeability, porosity and other rock properties for each cell. This process makes use of seismic data, well logs, and rock cores recovered when wells are drilled. Production from the reservoir can then be mathematically modeled by numerically solving a system of three or more nonlinear, partial differential equations describing fluid flow in the reservoir.

Computer analysis of production from an oil reservoir is usually divided into two phases, history matching and prediction. In the history matching phase, the past production behavior of the reservoir and its wells is repeatedly modeled, beginning with initial production and continuing up to the present time. The first computer run is based on a geological model as described above. After each run, the computer results are compared in detail with data gathered in the oil field during the entire period of production. Geoscientists modify the geological model of the reservoir on the basis of the differences between computed and actual production performance and rerun the computer model. This process continues until the mathematical reservoir model behaves like the real oil reservoir.

Once a suitable history match has been obtained, production from the oil reservoir can be predicted far into the future (sometimes for as long as 50 years). Oil recovery can be maximized and production costs minimized by comparing many alternative operating plans, each requiring a new run of the computer model. After a field development plan is put into action, the reservoir model may be periodically rerun and further tuned to improve its ability to match newly gathered production data.

When sufficient data is obtained about the reservoir, characteristics of a reservoir can be mathematically modeled to predict production rates from wells in that reservoir. The gross characteristics of the field include the porosity and permeability of the reservoir rocks, the thickness of the geological zones, the location and characteristics of geological faults, relative permeability and capillary pressure functions and such characteristics of the reservoir fluids as density, viscosity and phase equilibrum relationships. From this data, a set of continuous partial differential equations (PDEs) are generated that describe the behavior of the field as a function of time and production parameters. These production parameters include the locations of wells, the characteristics of the well's completions, and the operating constraints applied to the wells. Operating constraints may include such as the production rate of a particular fluid phase, the bottom hole pressure, the tubing head pressure, or the combined flow rates of a group of wells. These constraints may be applied directly by data or by means of another simulator that models the flow of fluids in the surface equipment used to transport the fluids produced from or injected into the wells. However, because only the simplest system of PDEs can be solved using classic or closed-form techniques (e.g., a homogeneous field having circular boundaries), a model's PDEs are converted into a set of non-linear approximations which are then solved numerically. One approximation technique is the finite difference method. In the finite difference method, reservoir PDEs are converted into a series of difference quotients which divide a reservoir into a collection of discrete three dimensional cells, which are then solved for at discrete times to determine (or predict) the value of reservoir characteristics such as pressure, permeability, fluid fractions, and at a later time.

Within the computerized reservoir simulator, reservoir performance is modeled in discrete increments of time. Each so-called timestep advances the solution from a previous point in time, where all variables are known, to a future point in time, where all variables are unknown. This process is repeated until the entire time period of interest has been modeled. Within each timestep it is necessary to solve a huge system of nonlinear equations that models fluid flow from cell to cell and through the wells. (With current technology it is possible to include several million cells in the reservoir model.) Solutions to the system of nonlinear equations are obtained by Newton iteration. In each such iteration the system of nonlinear equations is approximated by a system of linear equations, which must be solved by yet another iterative procedure.

Figure 8A:
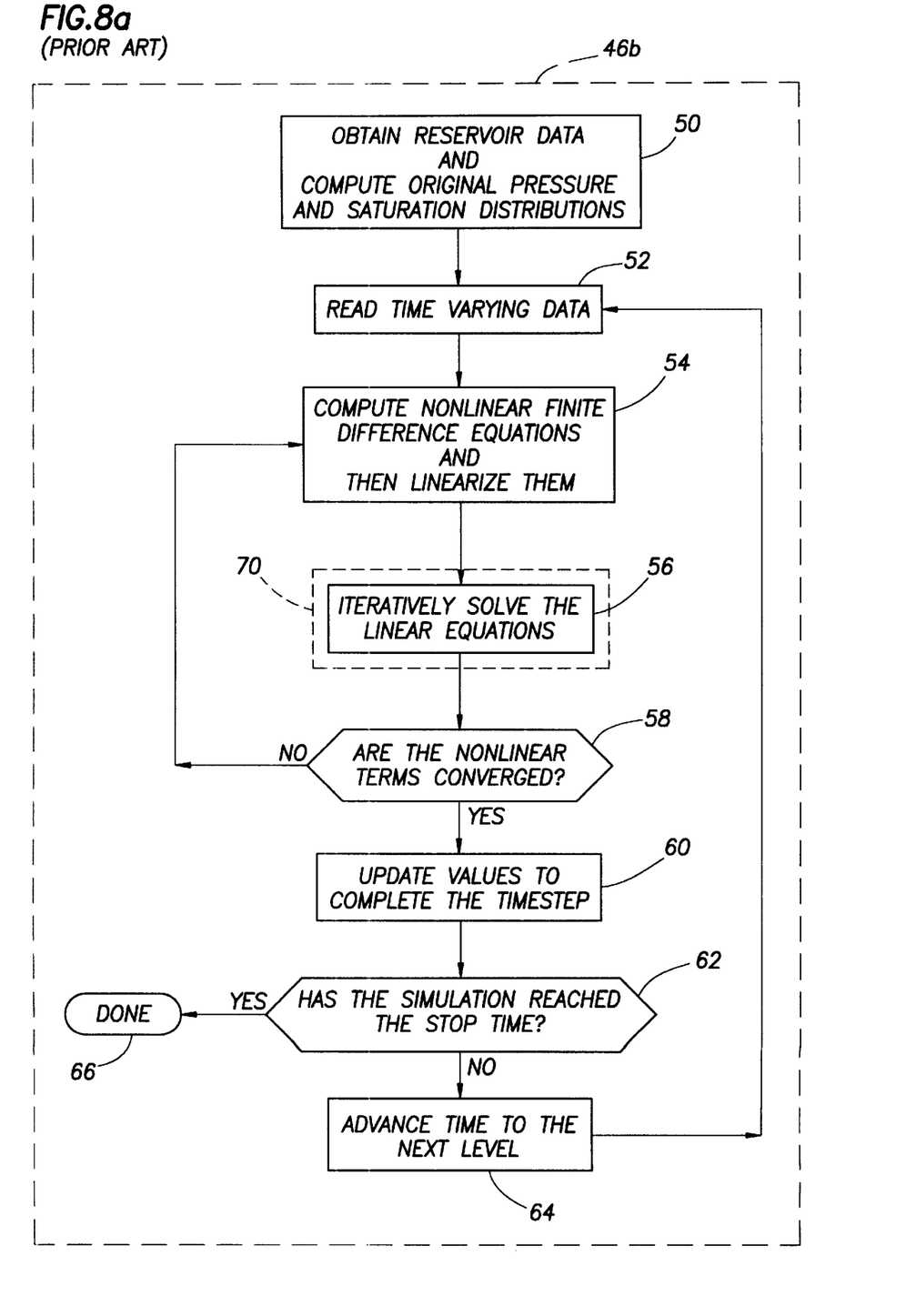
FIG. 8a illustrates a prior art approach or method of performing reservoir simulation which has been practiced by prior art reservoir simulators.

A general outline of the operation of a reservoir simulator follows (refer to FIG. 8a). Reservoir data and rock core data are used to describe a computational grid and the properties of the reservoir rocks. This is combined with data on the physical properties of the fluids contained in the reservoir and used to compute the initial distributions of pressure and fluid saturations (volume fractions) as well as the composition of each fluid phase. Time varying data, such as the locations and characteristics of wells, production and injection flow rate controls, and simulator control information, is read from a data base. Using the current pressure, saturation, and fluid compositions for each grid cell, the partial differential equations describing mass balances are approximated by finite differences resulting in two or more nonlinear algebraic equations for each cell. In addition, these nonlinear equations are linearized by means of Newton's method. The resulting system of linear equations is solved iteratively using methods described in this specification. After the linear equations have been solved, a test is performed to determine whether all of the nonlinear terms in the finite difference equations have converged. If not, the simulator returns to a previous step wherein the partial differential equations describing mass balances are approximated by finite differences. However, if the nonlinear terms have converged, the simulator updates values to complete the current timestep. Then, the simulator tests to determine whether the desired ending time in the simulation has been reached. If not, the simulator returns to a previous step to read new time varying data and begins the next timestep. However, if the endpoint of the simulation has been reached, then, the simulator completes output operations and the run is finished.

As reservoir simulations grow in complexity (e.g., number of parameters) and size (e.g., number of cells), solving the resulting system of linear equations, represented by the matrix equation $A\vec{x}=\vec{b}$ requires an increasingly large effort. For example, the work involving the iterative solution increases with the square of the number of parameters per cell. In many reservoir models, the time required to solve systems of linear equations (step 56 in FIG. 8a) can be a limiting factor on the simulation's usefulness.

In connection with reservoir modeling, well logging operations are performed in the formation thereby producing well log data, and seismic operations are performed on the formation thereby producing seismic data. The seismic data is reduced thereby producing reduced seismic data. The well log data and the reduced seismic data are introduced, as input data, to a computer workstation which stores a gridding software and a simulator software. A gridding software, hereinafter known as "the Flogrid software" or the "Flogrid gridding software", is disclosed in prior pending U.S. patent application Ser. No. 09/034,701, filed in the U.S. on Mar. 4, 1998, which is based on a Great Britain patent application number 9727288.4 filed Dec. 24, 1997, the disclosure of which is incorporated by reference into this specification. The "Flogrid" gridding software includes another gridding software known as "Petragrid". The "Petragrid" gridding software is disclosed in prior pending U.S. patent application Ser. No. 08/873,234 filed Jun. 11, 1997, the disclosure of which is also incorporated by reference into this specification. The gridding software will respond to the reduced seismic data and the well log data by gridding the earth formation which was subjected to the well log operation and the seismic operation. The type of grids imposed on the earth formation include structured (approximately rectangular) grids and unstructured (tetrahedral) grids. A property, such as permeability or water saturation, is assigned to each cell or grid block of the grid. As a result, a set of output data is generated by the gridding software, the set of output data including the plurality of cells/grid blocks of the grid and the respective plurality of properties associated with each of the cells of the grid.

The set of output data from the gridding software are introduced, as input data, to a reservoir simulator software. The reservoir simulator software will respond to the set of output data from the gridding software by generating a plurality of simulation results which are associated, respectively, with the plurality of cells/grid blocks of the grid received from the gridding software. The plurality of simulation results and the plurality of cells/grid blocks associated therewith, generated by the reservoir simulator software, will be displayed on a 3D viewer of the workstation for observation by a workstation operator. Alternatively, the plurality of simulation results and the plurality of cells/grid blocks associated therewith can be recorded for observation by a workstation recorder.

The reservoir simulator software can model an oilfield reservoir. For example, in the Society of Petroleum Engineers (SPE) publication number 28545, concerning a transient tool for multiphase pipeline and well simulation, dated 1994, the authors have solved for pressure losses along a single pipeline using a technique related to conservation of material and conservation of pressure. A similar technique has been applied to a network of pipelines or flowlines in the Society of Petroleum Engineers (SPE) publication number 29125, authored by Litvak and Darlow. In this publication, the authors (Litvak and Darlow) have taken a network model (i.e., a network of pipelines) in which the pressure losses along the network branches can either be calculated from tables or from an analytical model, and the analytical model solves for three (3) conservations and pressures. In addition, in an article by the "Society of Petroleum Engineers" (SPE) 12259, each well being modeled in that article was characterized by three (3) variables: pressure, water fraction, and gas fraction.

As noted earlier, in many reservoir models, the time required to solve systems of linear equations (step 56 in FIG. 8a) can be a limiting factor on the simulation's usefulness. Accordingly, it would be beneficial to have a method that can be used to efficiently solve large systems of linear equations. It is the solution of this system of linear equations that is the subject of the invention of this specification.

Accordingly, a new and improved reservoir simulator software is needed wherein the amount of time required to execute the new and improved reservoir simulator software is much less than the amount of time required to execute the reservoir simulator software of the prior art.

SUMMARY OF THE INVENTION

Accordingly, it is a primary object of the present invention to provide an improved method of performing computer simulations.

It is a primary aspect of this invention to provide a simulation program that includes a "Linear Solver" method and apparatus which operates with reduced processing time relative to prior art simulators.

It is a further aspect of this invention to provide a simulation program that includes a "Linear Solver" method and apparatus which practices a method for solving systems of differential equations having substantially fewer steps than conventional methods of solving differential equations.

It is a further aspect of this invention to provide a simulation program which includes a "Linear Solver" method and apparatus that generates a set of simulation results prior to completely solving a system of differential equations.

In accordance with the primary object and other aspects of the present invention, an improved "Linear Solver" method and apparatus is disclosed for simulating conditions and characteristics that are mathematically modeled using linear and non-linear systems of differential equations. These systems of differential equations are very large and complex and require substantial processing time to solve. The processing time required to execute a simulation program can have an effect on the accuracy of the simulation results. The present invention provides a faster method to solve differential equation systems by generating a smaller approximated matrix that is an approximation of the system of equations. This smaller approximated matrix is smaller than another matrix that represents the original system of equations. From the smaller approximated matrix, information that is usually determined from the solved equations is obtained prior to the step of solving the differential equation system. The reduced size of the smaller approximated matrix, coupled with the fact that some of the final information is obtained prior to completely solving the system of differential equations, results in a faster simulation method.

Consequently, the "Linear Solver" of the present invention provides a method for solving a system of linear equations representing physical characteristics of an oil and/or gas reservoir. This method includes receiving a first signal representing physical characteristics of the reservoir, obtaining a residual vector $\vec{r}_0$ (representing errors associated with a system of nonlinear equations describing the reservoir) and a first matrix $A_0$ (representing the sensitivity of the residual vector $\vec{r}_0$ to changes in the system of nonlinear equations) from the received first signal; recursively decomposing matrix $A_0$ into a lower block triangular matrix, an upper block triangular matrix, and a diagonal matrix; and generating a second matrix $M_0$ that is an approximation to matrix $A_0$. The invention further provides generating an approximate solution for the system of linear equations (in the form of a signal) without directly computing the matrix multiplication $A_0 \vec{x} = \vec{b}$ required of conventional techniques.

At each time step of the simulation, it is necessary to solve a system of linear equations represented by $A_0 x = r_0$. $A_0$ is a matrix obtained from the data input into the simulation program. $A_0$ is a sparse matrix in that there are few non-zero elements in the matrix. Because of the size of the matrix, it would be very costly to solve the system of differential equations associated with this matrix $A_0$ directly. Therefore, $A_0$ is decomposed into smaller matrix components that will be easier to factor, including an upper matrix component, a lower matrix component and diagonal matrix components.

An approximate matrix $M_0$ is generated from the matrix components. This matrix $M_0$ can be factored. Once the factorization process is complete, this matrix $M_0$ can be solved to get a result similar to the result obtained from solving the original matrix $A_0$. However, solving the $M_0$ matrix requires much less time than the original matrix $A_0$ would require. This process is possible because data normally determined from solving the original matrix $A_0$ is obtained from information determined during the factorization of matrix $M_0$. Therefore, the process time required to solve the matrix $M_0$ is much less because some of the information obtained from solving the original matrix $A_0$ has already been determined during the factorization of matrix $M_0$.

The inventive concept may be embodied in a computer program stored in any media that is readable and executable by a computer system. Illustrative media include magnetic and optical storage devices. Illustrative programming languages include Fortran and C. Illustrative computer systems include personal computers, engineering workstations, minicomputers, mainframe computers, and specially designed state machines.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 9 through 13 illustrate the "Linear Solver" method and apparatus in accordance with the present invention which is embodied in the "Eclipse simulator software" of FIGS. 5 and 6, and wherein:

DETAILED DESCRIPTION OF THE PREFERRED EMBODIMENT

The "Eclipse" simulator software of the present invention receives output data from the "Flogrid" simulation gridding software and, responsive thereto, the "Eclipse" simulator software generates a set of simulation results which are displayed on a 3D viewer. The "Eclipse" simulator software includes the "Linear Solver" method and apparatus in accordance with the present invention. The "Linear Solver" apparatus of the present invention includes a special apparatus which allows the simulation processing time of the "Eclipse" simulator to be substantially less than the processing time associated with the prior art reservoir simulators.

This specification is divided into two parts: (1) a Background discussion which provides background information relating to the performance of a seismic operation and a well logging operation adapted for generating seismic and well logging data, the seismic and well logging data being provided as input data to a workstation that stores a "Flogrid" simulation gridding software and an "Eclipse" simulator software, and (2) a more detailed description of the "Eclipse" simulator software, the "Eclipse" simulator software including a "Linear Solver" method and apparatus in accordance with the present invention which causes or allows the simulation processing time of the Eclipse simulator to be substantially less than the simulation processing time associated with other prior art simulators.

Background Discussion

Figures 1, 2:
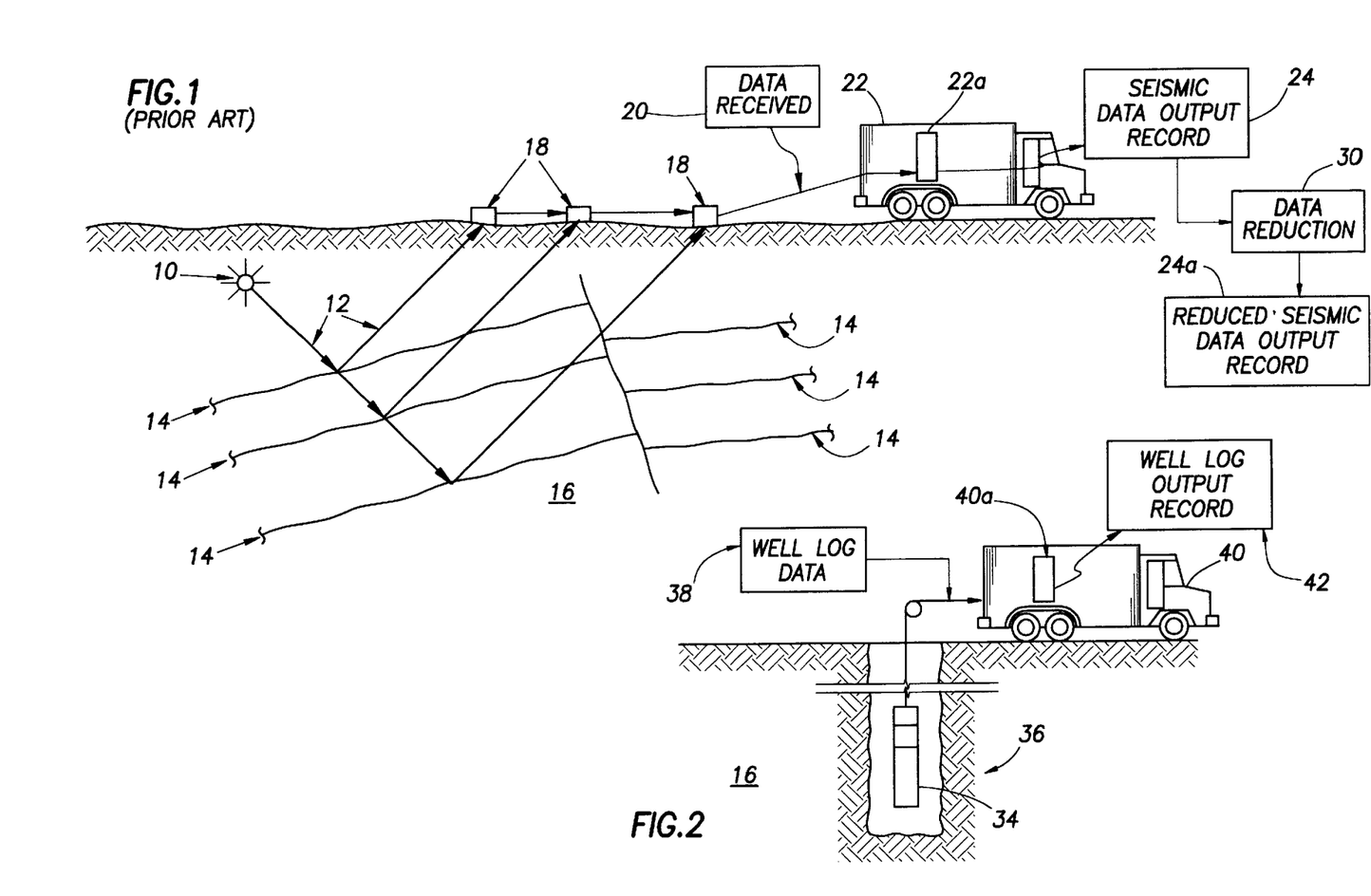
FIG. 1 illustrates a seismic operation for producing a reduced seismic data output record, the seismic operation of FIG. 1 including a data reduction operation.
FIG. 2 illustrates a wellbore operation for producing a well log output record.

Referring to FIG. 1, a method and apparatus for performing a seismic operation is illustrated. During a seismic operation, a source of acoustic energy or sound vibrations 10, such as an explosive energy source 10, produces a plurality of sound vibrations. In FIG. 1, one such sound vibration 12 reflects off a plurality of horizons 14 in an earth formation 16. The sound vibration(s) 12 is (are) received in a plurality of geophone-receivers 18 situated on the earth's surface, and the geophones 18 produce electrical output signals, referred to as "data received" 20 in FIG. 1, in response to the received sound vibration(s) 12 representative of different parameters (such as amplitude and/or frequency) of the sound vibration(s) 12. The "data received" 20 is provided as "input data" to a computer 22a of a recording truck 22, and, responsive to the "input data", the recording truck computer 22a generates a "seismic data output record" 24. Later in the processing of the seismic data output record 24, such seismic data undergoes "data reduction" 30 in a mainframe computer, and a "reduced seismic data output record" 24a is generated from that data reduction operation 30.

Referring to FIG. 2, a well logging operation is illustrated. During the well logging operation, a well logging tool 34 is lowered into the earth formation 16 of FIG. 1 which is penetrated by a borehole 36. In response to the well logging operation, well log data 38 is generated from the well logging tool 34, the well log data 38 being provided as "input data" to a computer 40a of a well logging truck 40. Responsive to the well log data 38, the well logging truck computer 40a produces a "well log output record" 42.

Figure 3:
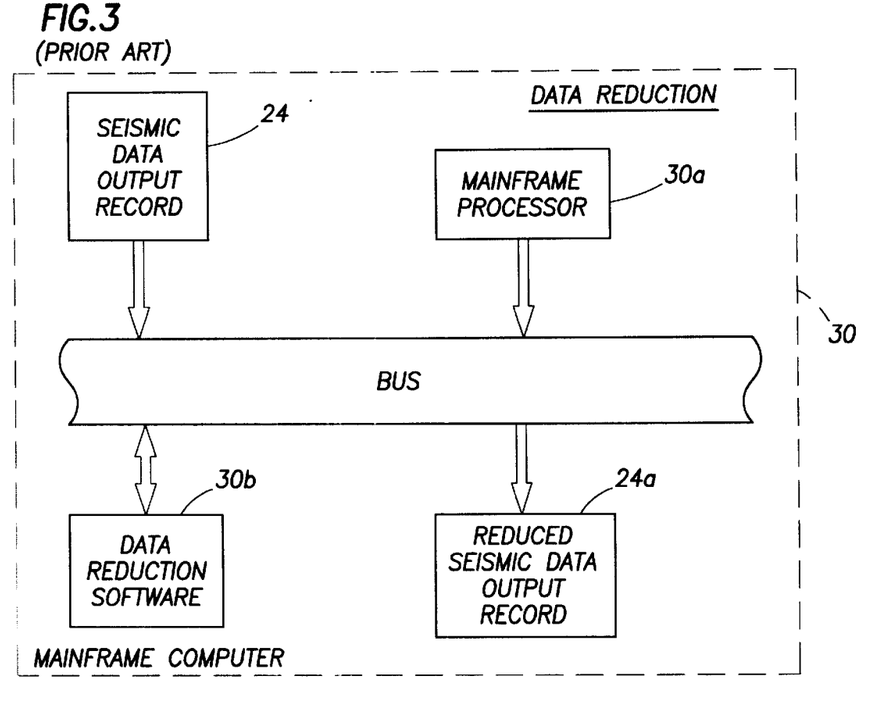
FIG. 3 illustrates a computer system for performing the data reduction operation of FIG. 1.

Referring to FIG. 3, the seismic data output record 24 of FIG. 1 is provided as "input data" to a mainframe computer 30 where the data reduction operation 30 of FIG. 1 is performed. A mainframe processor 30a will execute a data reduction software 30b stored in a mainframe storage 30b. When the execution of the data reduction software 30b is complete, the reduced seismic data output record 24a of FIGS. 1 and 3 is generated.

Figure 4:
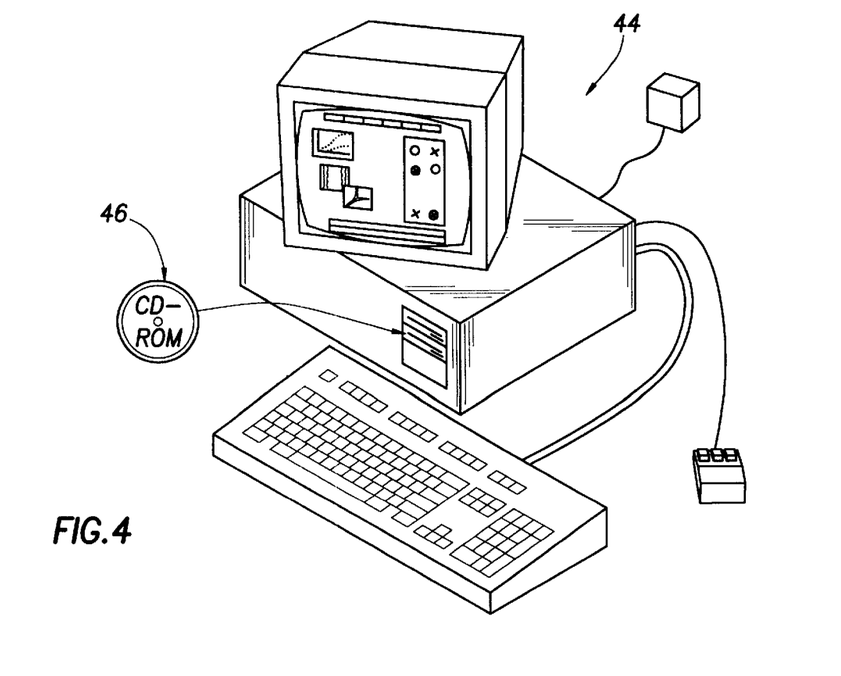
FIGS. 4 and 5 illustrate a workstation adapted for storing a "Flogrid" software and an "Eclipse" simulator software.
Figure 5:
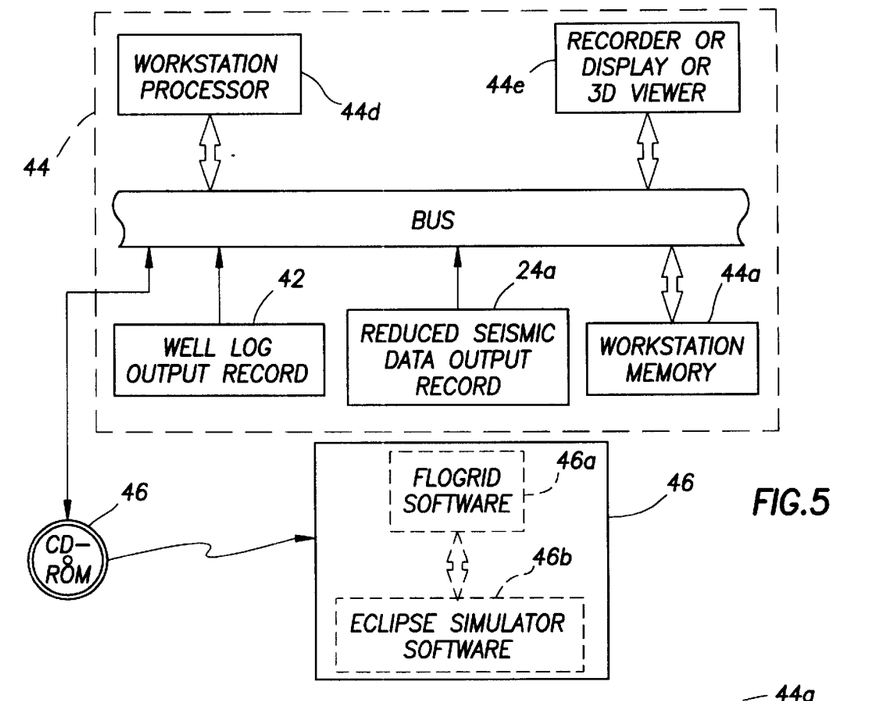

Referring to FIGS. 4 and 5, a workstation 44 is illustrated in FIG. 4. A storage medium 46, such as a CD-Rom 46, stores software, and that software can be loaded into the workstation 44 for storage in the memory of the workstation. In FIG. 5, the workstation 44 includes a workstation memory 44a, the software stored on the storage medium (CD-Rom) 46 being loaded into the workstation 44 and stored in the workstation memory 44a. A workstation processor 44d will execute the software stored in the workstation memory 44a in response to certain input data provided to the workstation processor 44d, and then the processor 44d will display or record the results of that processing on the workstation "recorder or display or 3D viewer" 44e. The input data, that is provided to the workstation 44 in FIG. 5, includes the well log output record 42 and the reduced seismic data output record 24a. The "well log output record" 42 represents the well log data generated during the well logging operation in an earth formation of FIG. 2, and the "reduced seismic data output record" 24a represents data-reduced seismic data generated by the mainframe computer 30 in FIG. 3 in response to the seismic operation illustrated in FIG. 1. In FIG. 5, the software stored on the storage medium (CD-Rom) 46 in FIG. 5 includes a "Flogrid" software 46a and an "Eclipse" simulator software 46b. When the storage medium (CD-Rom) 46 is inserted into the workstation 44 of FIG. 5, the "Flogrid" software 46a and the "Eclipse" simulator software 46b, stored on the CD-Rom 46, are both loaded into the workstation 44 and stored in the workstation memory 44a. The "Flogrid" software 46a is fully which is based on prior pending Great Britain patent GB2 326 747 B the disclosure of which is incorporated by reference into this specification. When the workstation processor 44d executes the Flogrid software 46a and the Eclipse simulator software 46b, the "Eclipse" simulator software 46b responds to a set of more accurate grid cell property information associated with a respective set of grid blocks of a structured simulation grid generated by the "Flogrid" software 46a by further generating a set of more accurate simulation results which are associated, respectively, with the set of grid blocks of the simulation grid. Those simulation results are displayed on the 3D viewer 44e of FIG. 5 and can be recorded on a recorder 44e.

Figure 6:
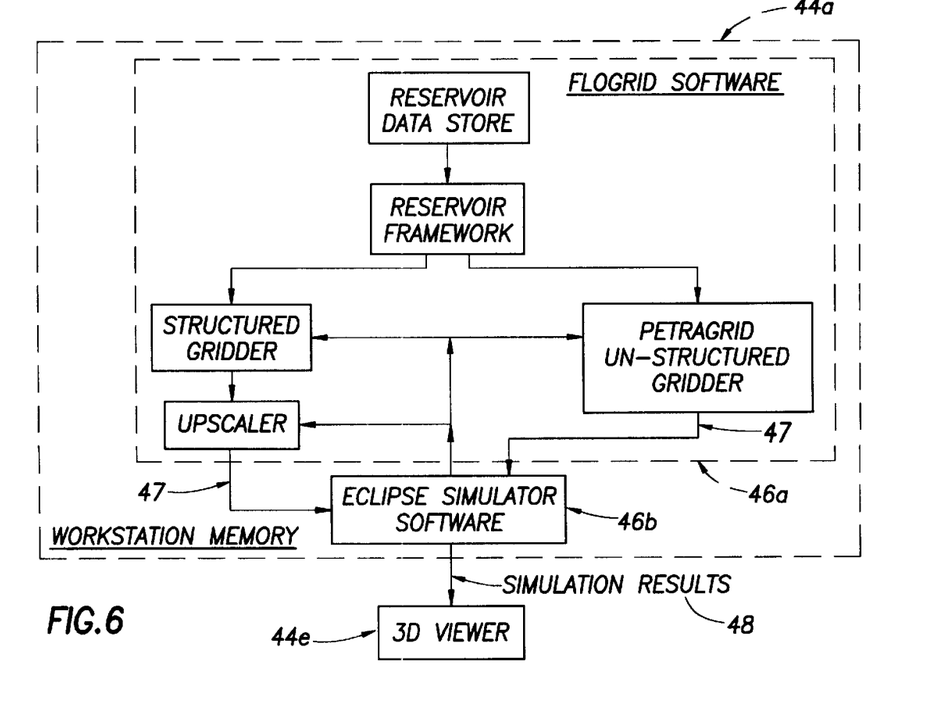
FIGS. 6 and 6a illustrate a more detailed construction of the "Flogrid" software of FIG. 5 which is adapted for generating output data for use by the "Eclipse" simulator software, the Eclipse simulator software including a "Linear Solver method and apparatus" in accordance with the present invention.
Figure 6A:
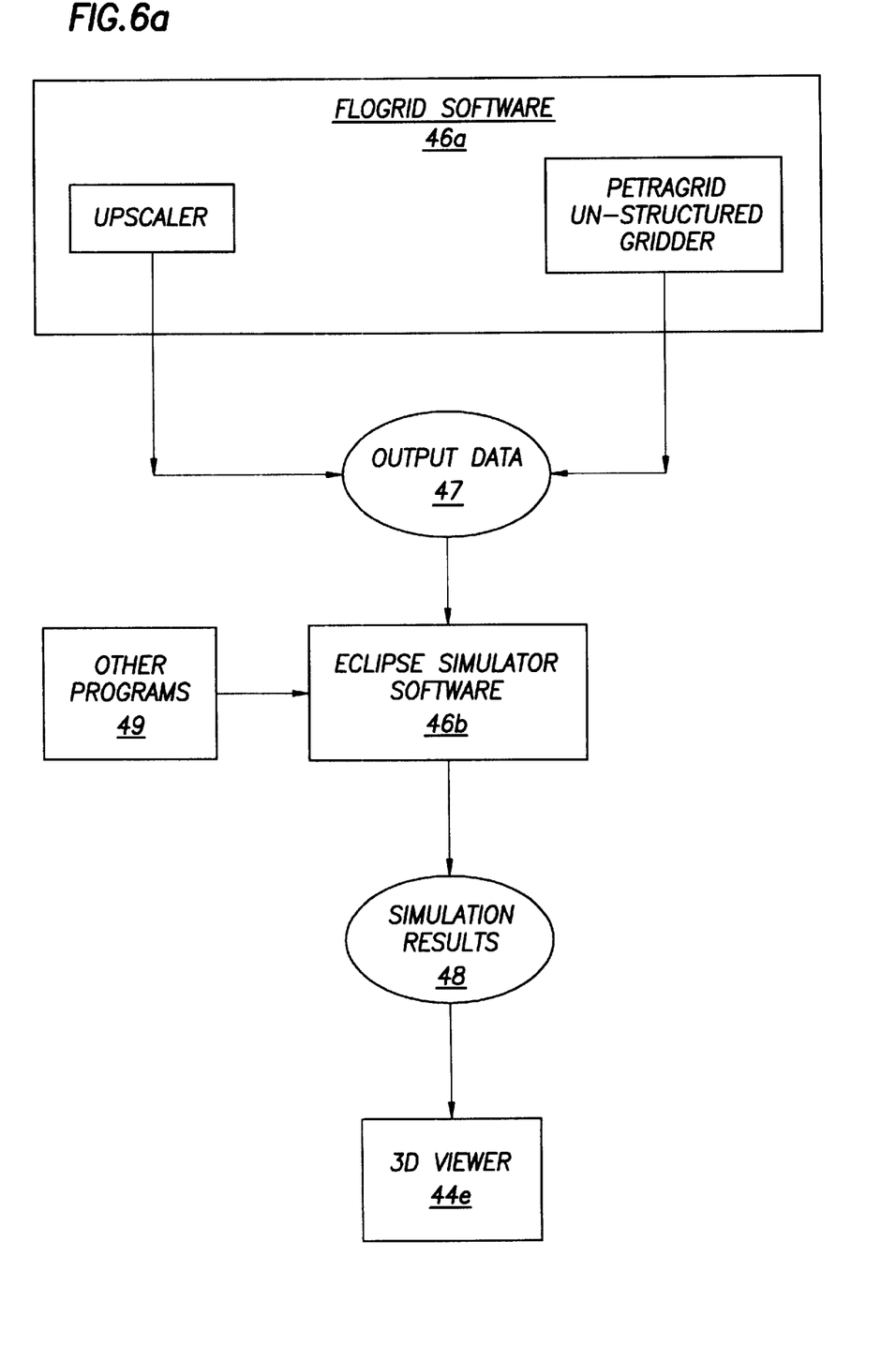

Referring to FIGS. 6 and 6a, in FIG. 6, the Flogrid software 46a and the Eclipse simulator software 46b are illustrated as being stored in the workstation memory 44a of FIG. 5. In addition, the "simulation results" 48, which are output from the Eclipse simulator software 46b, are illustrated as being received by and displayed on the 3D viewer 44e. The Flogrid software 46a includes a reservoir data store, a reservoir framework, a structured gridder, an unstructured gridder, and an upscaler, all of which are fully discussed in the above referenced prior pending U.S. patent application Ser. No. 09/034,701, filed in the U.S. on Mar. 4, 1998, the disclosure of which has already been incorporated by reference into this specification. In FIG. 6, a set of "simulation grids and properties associated with the grids" 47, generated by the Upscaler and the "Petragrid" unstructured gridder, are received by the Eclipse simulator software 46b. In response, the Eclipse simulator software 46b generates a "set of simulation results associated, respectively, with a set of grid blocks of the simulation grids" 48, and the simulation results and the associated grid blocks 48 are displayed on the 3D viewer 44e.

In FIG. 6a, the Flogrid software 46a generates a set of output data 47 comprising a plurality of grid cells and certain properties associated with those grid cells. That output data 47 is provided as input data to the Eclipse simulator software 46b. Some other programs 49 provide other input data to the Eclipse simulator software 46b. In response to the output data 47 (comprised of a gridded earth formation including a plurality of grid cells and certain properties associated with each of the grid cells), as well as the other output data from the other programs 49, the Eclipse simulator software 46b generates a set of "simulation results" 48, the simulation results 48 including the plurality of grid cells and a plurality of simulation results associated, respectively, with the plurality of grid cells. The aforementioned plurality of grid cells and the plurality of simulation results associated, respectively, with the plurality of grid cells are displayed on the 3D Viewer 44e of FIG. 6 and 6a.

Figure 7:
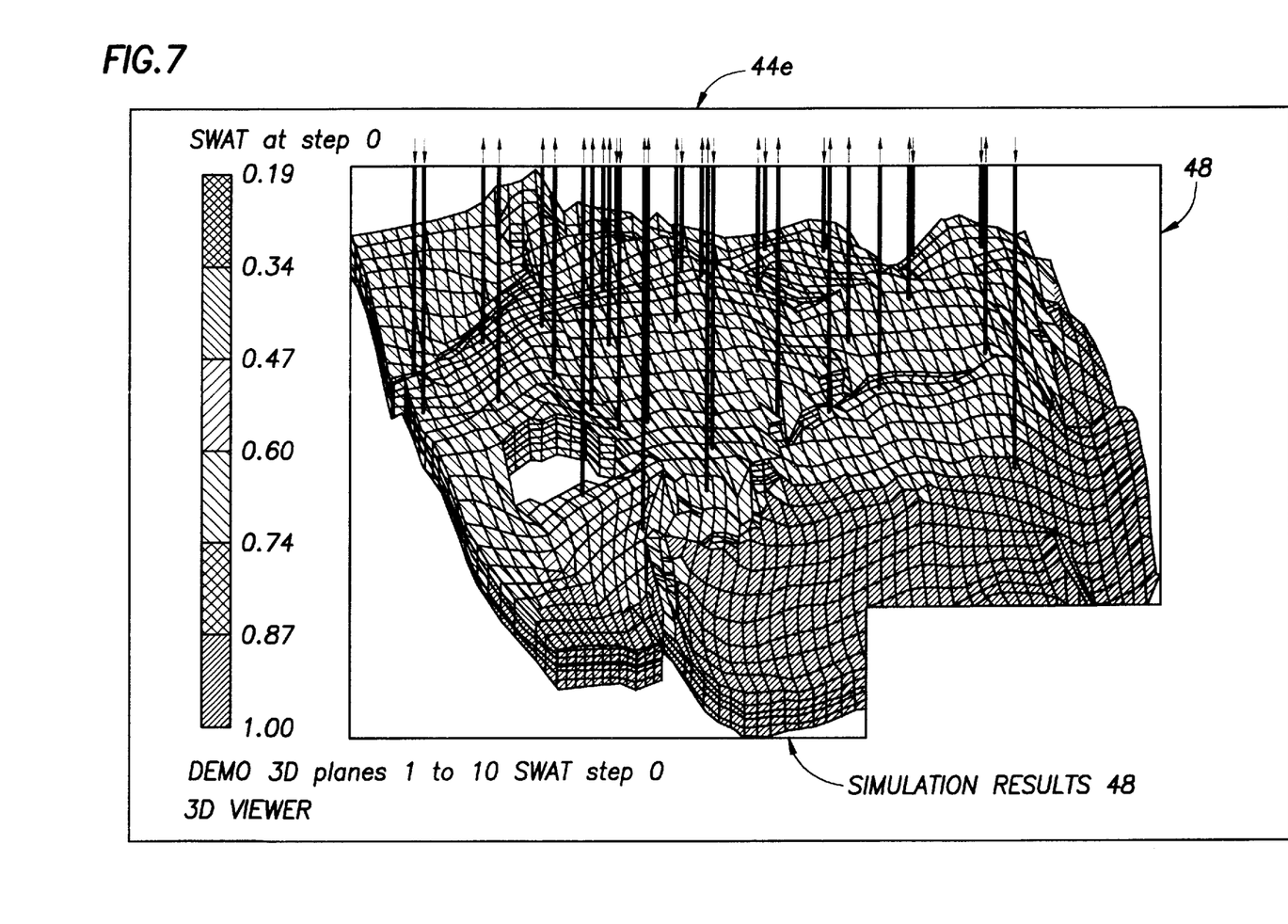
FIG. 7 illustrates an example of a typical output display generated by the "Eclipse" simulator software of FIG. 6 which is displayed on the 3D viewer of FIG. 6.

Referring to FIG. 7, an example of the simulation results 48 (i.e., the "plurality of grid cells and the plurality of simulation results associated, respectively, with the plurality of grid cells" 48) which are displayed on the 3D viewer 44e of FIGS. 5 and 6 and and 6a, is illustrated in FIG. 7.

Detailed Description of the Eclipse Simulator Software 46b of FIGS. 5 and 6 Including the "Linear Solver" Method and Apparatus in Accordance with the Present Invention Referring to FIG. 8a, a general outline of the operation of a prior art reservoir simulator is discussed below with reference to FIG. 8a. In FIG. 8a, reservoir data 42 and 24a of FIG. 5 and rock core data are used to describe a computational grid and the properties of the reservoir rocks. This data is combined with data relating to the physical properties of the fluids contained in the reservoir, the combined data being used to compute the initial distributions of pressure and fluid saturations (volume fractions) as well as the composition of each fluid phase, block 50 in FIG. 8a. Time varying data, such as the locations and characteristics of wells, production and injection flow rate controls, and simulator control information is read from a data base, block 52. Using the current pressure, saturation, and fluid compositions for each grid cell, the partial differential equations describing mass balances are approximated by finite differences in block 54 which results in two or more nonlinear algebraic equations for each grid cell. Also, in block 54, these nonlinear equations are linearized by means of Newton's method. In block 56, the resulting system of linear equations is solved iteratively, using methods described in this specification. After the linear equations have been solved, there is a test in block 58 to determine whether all of the nonlinear terms in the finite difference equations have converged. If not, the simulator returns to block 54. If the nonlinear terms in the finite difference equations have converged, the simulator moves to block 60 and updates values to complete the current timestep. In block 62, the simulator tests to determine whether the desired ending time (i.e., the stop time) in the simulation has been reached. If not, the simulator advances time to the next level, block 64, and then it returns to block 52 to read new time varying data and to begin the next timestep. If the endpoint of the simulation has been reached, then, the simulator completes output operations and the run is finished, block 66.

Figure 8B:
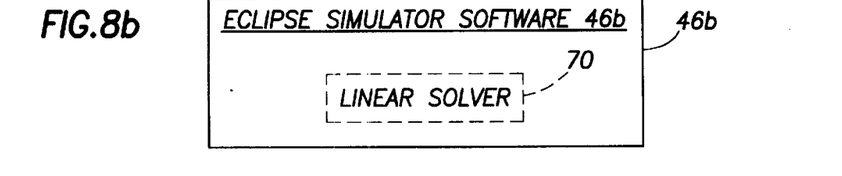
FIG. 8b illustrates the Eclipse simulator software of FIG. 5 including the Linear Solver of the present invention.

Referring to FIG. 8b, as noted earlier, the Eclipse simulator software 46b of FIGS. 5 and 6 includes the "Linear Solver" 70 in accordance with the present invention. The Linear Solver 70 substantially reduces the simulation processing time which is normally associated with prior art reservoir simulators.

As noted earlier with reference to FIG. 8a, blocks 54 and 56, nonlinear partial differential equations are linearized (block 54 of FIG. 8a) and the resulting system of linear equations is solved iteratively, using methods discussed in this specification (block 56 of FIG. 8a). If the nonlinear terms are not converged (block 58 in FIG. 8a), the following discussion with reference to FIGS. 9 through 13 will discuss those methods for solving a system of non-linear partial differential equations.

Figure 9:
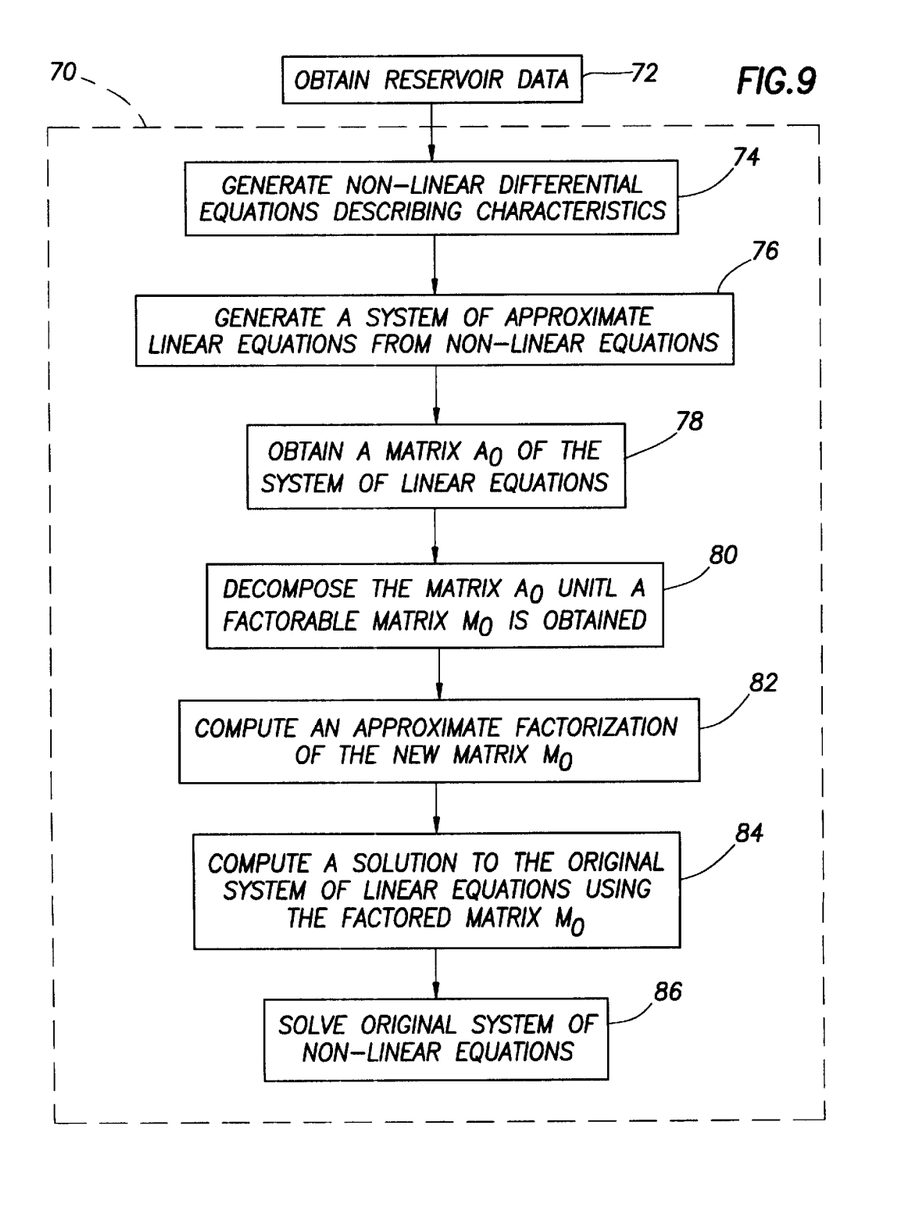
FIG. 9 illustrates the approach or method of performing reservoir simulation practiced by the "Eclipse" simulator software of present invention.

Referring to FIG. 9, a description of the Linear Solver 70 of the present invention of FIG. 8b will be discussed below in the context of a novel method for solving a system of nonlinear partial differential equations that represent an oil or gas reservoir, that novel method being illustrated in FIG. 9.

The basic distinction between this invention and the conventional simulation methods is the way step 56 of FIG. 8a is performed (i.e., "iteratively solve the linear equations"). Systems of differential equations are very large and to solve them directly requires solving the equation $A_0 \vec{x} = \vec{b}$ for each time step of the simulation process. The conventional method would require substantial time and effort. To reduce the amount of processing time, the conventional simulation methods would require a reduction the amount of input data, which prevents a more accurate simulation. However, the simulation method (and apparatus) of the present invention performed by the Linerar Solver 70 performs steps that enable one to directly avoid the equation $A_0 \vec{x} = \vec{b}$ by solving an approximate system of equations in less time and without sacrificing accuracy in the results.

In FIG. 9, the Linear Solver 70 simulation method of present invention:

(1) converts the system of non-linear equations into a system of linear equations, block 76 of FIG. 9; (2) solves the system of linear equations; and then (3) solves the system of non-linear equations using the solved system of linear equations obtained during step (2).

The method practiced by the Linear Solver 70 of FIG. 8b of the present invention, for solving the system of linear equations from step (2) above, involves four basic steps that distinguishes the simulation method of the present invention from the conventional simulation methods. These four basic steps are set forth below with reference to FIG. 9 as follows:

(1) Obtain a matrix $A_0$ of the system of linear differential equations, block 78 in FIG. 9;
(2) Decompose this matrix $A_0$ into components [i.e., an upper block component, a lower block component, and a diagonal component], to facilitate factorization of the matrix $A_0$, until a new factorable matrix $M_0$ is obtained, block 80 in FIG. 9;
(3) Compute a factorization of this new factorable matrix $M_0$, block 82 in FIG. 9, to produce a system of linear equations that approximates the original matrix $A_0$; and
(4) Solve the system of linear equations from step (3) which are represented by matrix $M_0$, block 84 of FIG. 9.

This solution to matrix $M_0$ gives an approximate but accurate solution to the original matrix $A_0$. This solution to matrix $M_0$ is then used to solve the system of non-linear equations, block 86 in FIG. 9. The advantage of solving the matrix $M_0$ is that this matrix $M_0$ requires much less time to solve. In addition, the accuracy of the matrix $M_0$ is not a compromise because much of the "information" that is usually determined from calculating the matrix $A_0$ is calculated during the factorization step of matrix $M_0$ (block 82 of FIG. 9). Because this "information" is already calculated from the factorization step of matrix $M_0$, block 82, there is no need to calculate this "information" when solving matrix $M_0$, block 84. Therefore it takes less time to solve this matrix $M_0$ because there are fewer components to calculate.

In FIG. 9, generate a system of approximate linear equations from the original system of nonlinear equations, block 76 of FIG. 9, and generate a matrix $A_0$ from these linear equations, block 78. The matrix $A_0$, generated from the linear equations in block 78 of FIG. 9, is sparse in that it contains few non-zero elements. The small number of non-zero elements in this matrix $A_0$ and the fact that this matrix $A_0$ is very large and complex make it very difficult to solve the resulting system of equations directly. In order to solve this matrix $A_0$, the matrix $A_0$ is first decomposed into components (upper block, lower block and a diagonal), block 80 of FIG. 9. This decomposition divides the matrix $A_0$ into a plurality of smaller matrix blocks. Each of the plurality of smaller matrix blocks of the matrix $A_0$ is then recursively decomposed (the upper block from bottom to top and the lower block from top to bottom)) until a resulting matrix $M_0$ is generated which can be efficiently factored exactly (block 80). This decomposition of the matrix $A_0$ results in a new matrix $M_0$ that is an approximation of the original matrix $A_0$. The next step, block 82 of FIG. 9, involves the computation of a factorization of the matrix $M_0$, the computation of the factorization of the matrix $M_0$ generating a system of equations which is an approximation of the original set of linear equations and which can be more efficiently solved. This factorization step (computing the factorization of matrix $M_0$, block 82 of FIG. 9) generates the following equation:

$$M_0 = (L_0 M_1^{-1} + 1)(M_1 + U_0)$$

The solution of the above equation "$M_0 = (L_0 M_1^{-1} + 1)(M_1 + U_0)$" for matrix $M_0$, block 84 of FIG. 9, can be used to determine the solution to the original system of non-linear equations, block 86 of FIG. 9.

As indicated in block 82 of FIG. 9 (and the above step 3), one widely used technique to solve systems of linear equations is "nested factorization" which is defined to be an iterative technique for determining an approximate matrix corresponding to the system's coefficient matrix. A system of linear equations representing reservoir characteristics may be solved by exploiting certain, and heretofore unrecognized, characteristics of the nested factorization method. The following embodiment of this inventive concept, relating to oil and gas reservoir modeling, is illustrative only and is not to be considered limiting in any respect.

Referring to FIGS. 10 through 13, these figures will discuss, in detail, some of the individual steps of FIG. 9 which are practiced by the Linear Solver 70 of the present invention.

Figure 10:
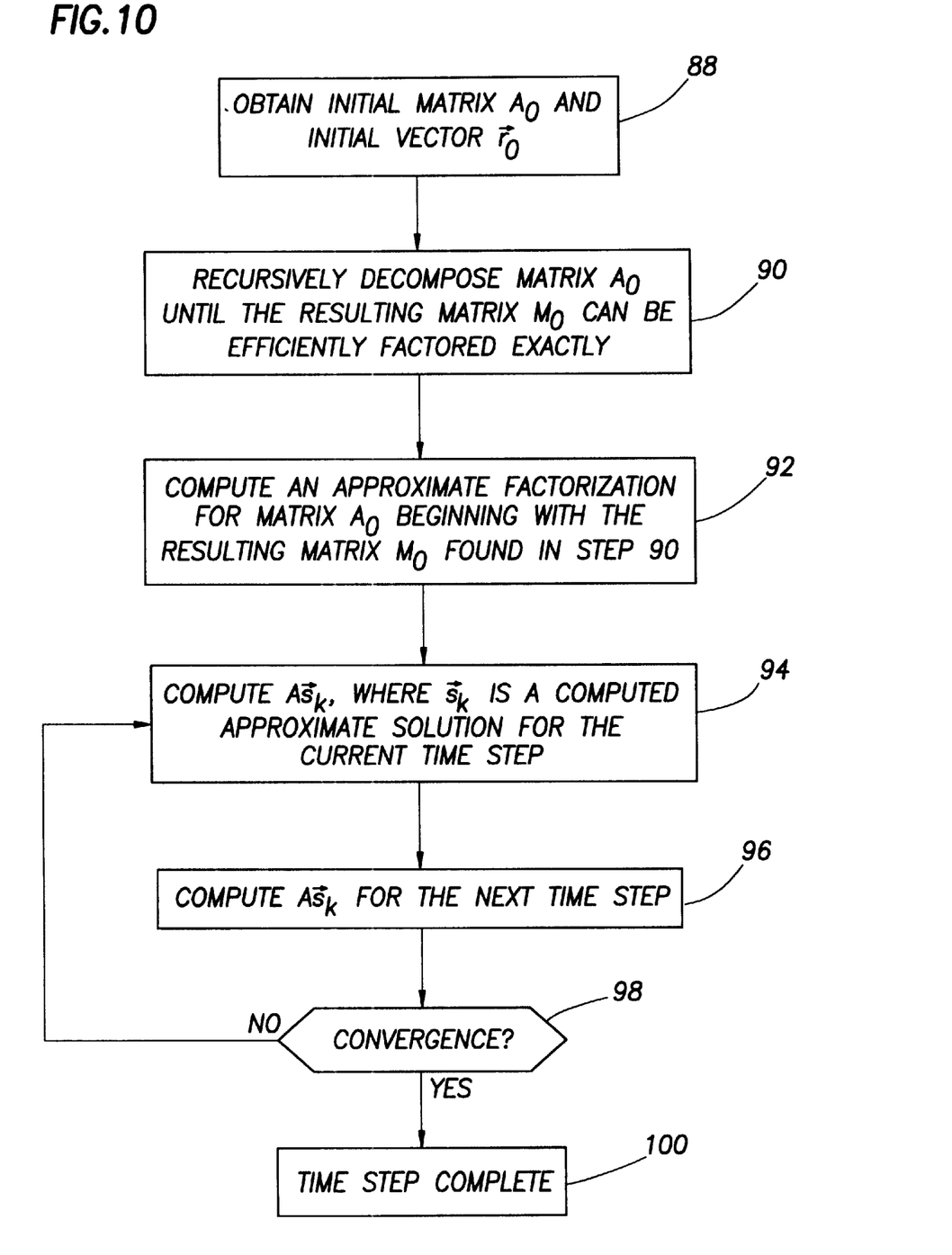
FIG. 10 outlines a technique or method for solving a system of linear equations.

In FIG. 10, a system of linear equations (represented by the matrix equation $A_0 \vec{x} = \vec{r}_0$), which have been derived from partial differential equations (PDEs) via finite difference quotients, can be characterized, for each iteration, as a seven step process. In FIG. 10, block 88, an initial matrix $A_0$ and an initial residual vector $\vec{r}_0$ are obtained. Initial residual vector $\vec{r}_0$ is the vector of current errors (residuals) for the system of nonlinear equations. Matrix $A_0$ is a sparse Jacobian matrix that describes the sensitivity of the residuals to changes in $\vec{x}$ for the system of nonlinear equations. In block 90 of FIG. 10, matrix $A_0$ is decomposed into smaller and smaller matrices until a matrix is found which is efficiently factored exactly. A matrix can be efficiently factored exactly when it has a bandwidth of less than or equal to approximately 7. Starting with the largest decomposed matrix of $A_0$ that can be efficiently factored exactly (found in block 90 of FIG. 10), an approximate factorization for matrix $A_0$ is found such that $A_0 \approx M_0 = LU$ where L is a block lower triangular and U is a block upper triangular matrix, block 92 of FIG. 10. Using the LU factorization of matrix $A_0$ (i.e., matrix $M_0$), the value of $A_0 \vec{s}$ is computed where $\vec{s}$ is a computed approximation for the original linear system at the current time step, block 94 of FIG. 10. A predicted value of $A_0 \vec{s}$ is then computed for the next time step, block 96 of FIG. 10, which is then checked for convergence. If the predicted value $A_0 \vec{s}$ converges (the "yes" prong of block 98 in FIG. 10), the current time step has been completed, block 100 of FIG. 10. If the predicted value of $A_0 \vec{s}$ does not converge (the "no" prong of block 98), blocks 94 and 96 of FIG. 10 are repeated. Blocks 88 through 100 of FIG. 10 are repeated for each time step in the simulation.

Figure 11:
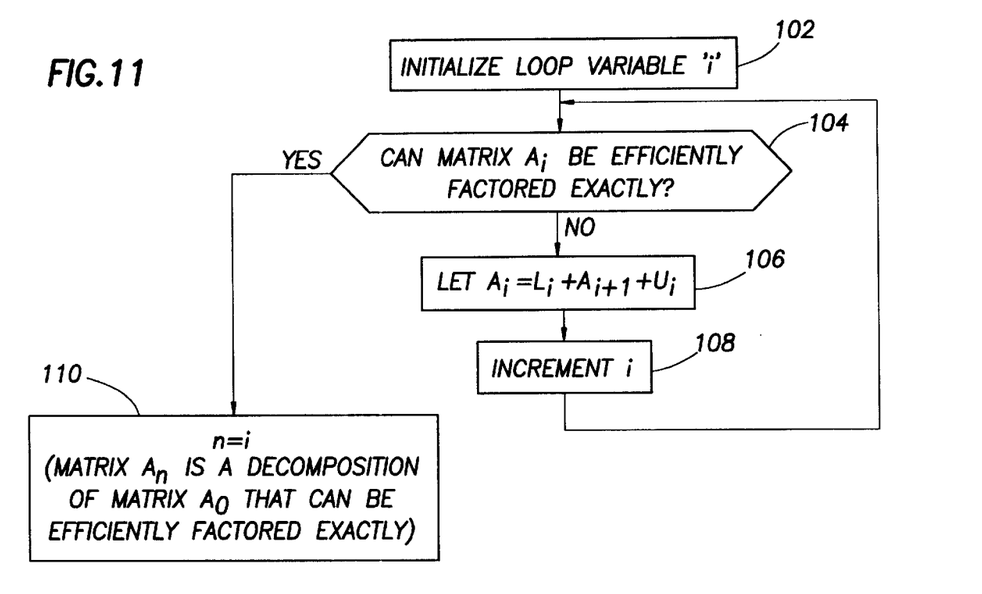
FIG. 11 illustrates a matrix decomposition technique or method practiced by the "Eclipse" simulator software of the present invention.

In FIG. 11, a modified nested factorization technique to decompose matrix $A_0$ (i.e., block 92 of FIG. 10) is illustrated in FIG. 11. After initializing loop variable 'i' to zero, block 102 of FIG. 11, a test is made to determine if the matrix denoted by $A_i$ can be efficiently factored exactly. If matrix $A_i$ cannot be efficiently factored exactly (the 'no' prong of block 104 of FIG. 11), matrix $A_i$ is partitioned (i.e, decomposed) such that $A_i = L_i + A_{i+1} + U_i$ where $L_i$ is a lower triangular matrix, $U_i$ is an upper triangular matrix, and $A_{i+1}$, is a block diagonal matrix, block 106 of FIG. 11. Next, loop control variable 'i' is incremented (block 108 in FIG. 11) and processing continues at block 104 of FIG. 1. If matrix $A_i$ can be efficiently factored exactly (the 'yes' prong of block 104 of FIG. 11), control variable 'n' is assigned the current value of loop control variable 'i' (block 110 in figure 11). For computational efficiency, matrix $A_n$ is preferably the largest (i.e., first found) decomposition of matrix $A_0$ that can be efficiently factored exactly.

Figure 12:
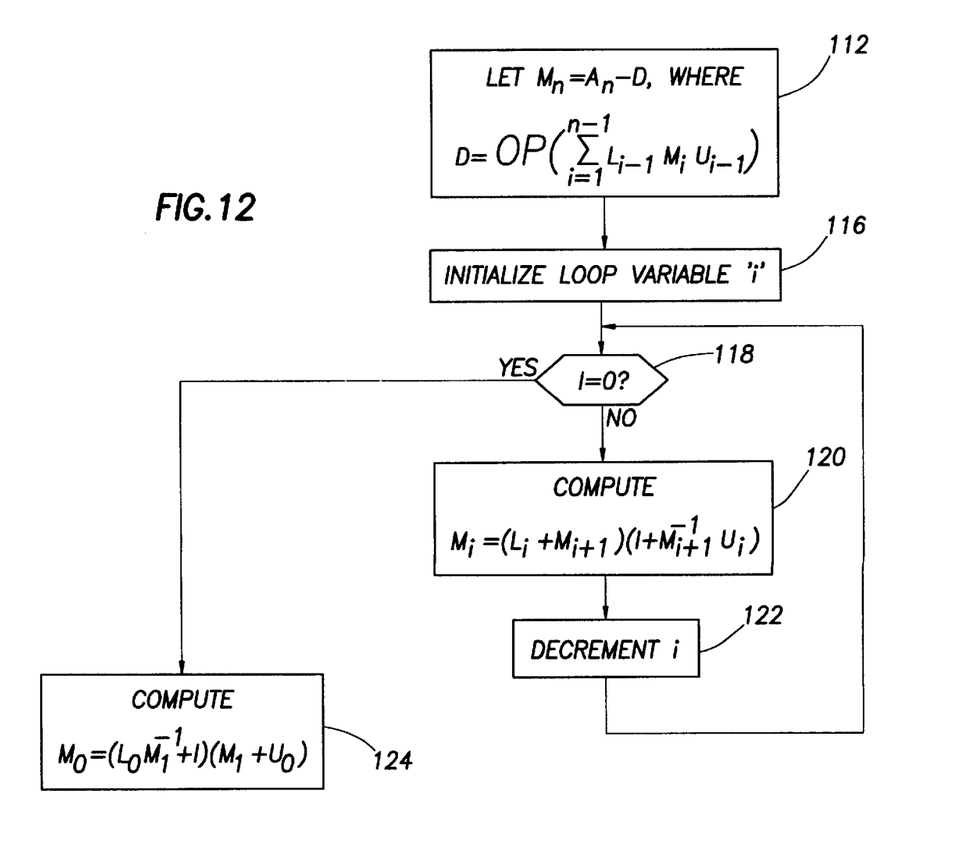
FIG. 12 illustrates a factorization technique practiced by the "Eclipse" simulator software in the present invention.

In FIG. 12, a technique for generating an approximate factorization of matrix $A_0$ (block 92 in FIG. 10) is shown in FIG. 12. Matrix $M_n$ is initialized to $A_n - D$ where matrix D is a diagonal matrix defined by:

$$OP\left(\sum_{i=1}^{n-1} L_{i-1} M_i^{-1} U_{i-1}\right) \quad \text{or} \quad OP\left(\sum_{i=1}^{n-1} L_{i-1} M_i^{-1} U_{i-1}\right), \text{ and}$$

OP represents either a column-sum operator or a row-sum operator (block 112 of FIG. 12). The column-sum of matrix X is a diagonal matrix formed by summing the elements of matrix X in columns. The row-sum of matrix X is a diagonal matrix formed by summing the elements of matrix X in rows. Next, loop variable 'i' is initialized to 'n−1' (block 116 of FIG. 12) and a test is made to determine if the factorization loop is complete. If variable 'i' does not equal zero (the 'no' prong of block 118 of FIG. 12), the next $M_i$ matrix is computed in accordance with the following:

$$M_i=(L_i+M_{i+1})(I+M_{i+1}^{-1}U_i),$$

where I represent the identity matrix (block 120 of FIG. 12). Loop control variable 'i' is then decremented (block 122), and processing continues at block 118. If variable 'i' equals zero (the 'yes' prong of block 118), matrix $M_0$ (the factored approximation to $A_0$) is computed in accordance with:

$$M_0=(L_0M_1^{-1}+I)(M_1+U_0), \text{ block } \mathbf{124} \text{ of FIG. } \mathbf{12}.$$

Figure 13:
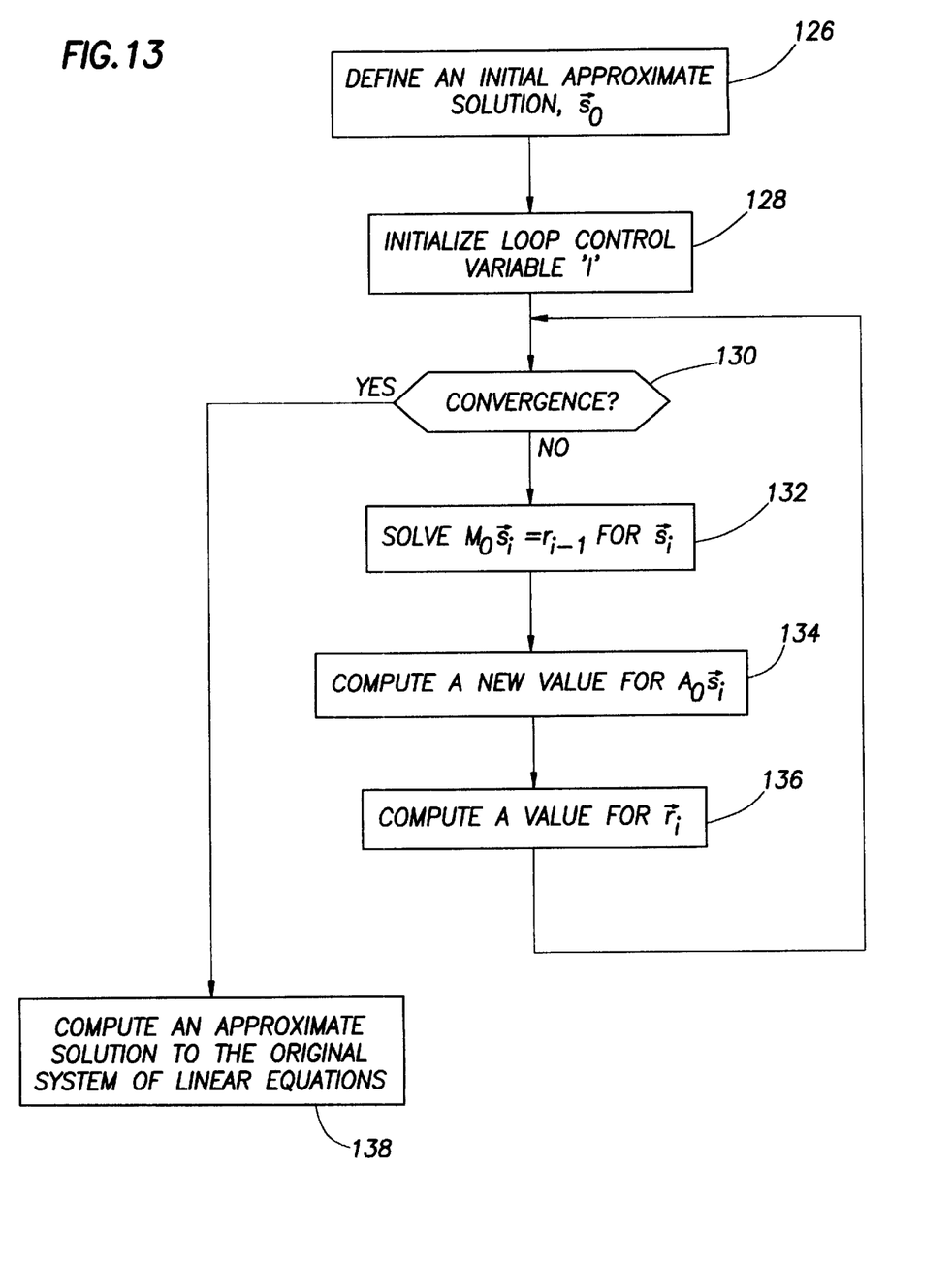
FIG. 13 illustrates a method for producing an approximate solution to an original system of linear equations in accordance with an inventive concept of the present invention.

In FIG. 13, during each iteration (step 94 through 100 of FIG. 10), an approximate solution $\vec{x}'$ to the original system of linear equations $(A_0 \vec{x} = \vec{r}_0)$ is generated in accordance with FIG. 13. First, an initial solution $\vec{s}_0$ is defined, e.g., $\vec{s}_0=0$ (block 126 of FIG. 13). Next, loop variable 'i' is initialized to 1 (block 128 of FIG. 13) and a test is made to determine if the current solution has converged. If the current solution (e.g., that solution associated with the current time step) has not converged (the 'no' prong of block 130), the equation $M_0 \vec{s}_i = \vec{r}_{i-1}$ is solved for $\vec{s}_i$ (block 132 of FIG. 13). One benefit of the methods illustrated in FIGS. 11 and 12 is that the following interim results are obtained at no additional computational cost:

$$\vec{y}=(L_0M_1^{-1}+I)^{-1}\vec{r}$$

$$\vec{q}=(M_1+U_0)^{-1}\vec{y}; \text{ and}$$

$$\vec{z}_j=M_{k+1}^{-1}U_k\vec{q} \text{ (for } k=1,\ldots,n-1\text{)}$$

These interim results can be used to compute a value for $A\vec{s}_i$, that is, $A_0(M_0^{-1}\vec{r}_{i-1})$, in accordance with the following (block 134 of FIG. 13):

$$A_0(M_0^{-1}\vec{r}_{i-1}) = \vec{y} + D\vec{q} + L_0\vec{q} - \sum_{k=1}^{n-1} L_k \vec{z}_k$$

The method of computing $A\vec{s}_i$ outlined above and in FIG. 13 uses only (n+1) diagonal vector multiplies, compared with the (2n+m) diagonal vector multiplies required by prior matrix multiplication techniques [where 'n' equals the value determined at block 110 of FIG. 11, and 'm' equals the number of diagonals (e.g., the bandwidth) of $A_n$]. The computational savings provided by the inventive method over the prior technique in two, three, and four dimensional (i.e., 2-D, 3-D, and 4-D respectively) oil and gas reservoir simulations can be described in percentage terms as shown in Table 1 below:

TABLE 1

Computational Savings of Inventive Concept

| | m | n | %-Savings |
|---|---|---|---|
| 2-D Simulation | 3 | 1 | 40 |
| 3-D Simulation | 3 | 2 | 42.9 |
| 4-D Simulation | 3 | 3 | 44.4 |

$$\%\text{-Savings} = \frac{n+1}{2n+m} \times 100$$

In FIG. 13, block 136, a value for vector $\vec{r}_i$ may be calculated using any suitable acceleration method. Illustrative stationary acceleration methods include the Jacobi, Guass-Seidel, successive over relaxation (SOR), and symmetric successive over relaxation (SSOR) methods. Illustrative nonstationary acceleration methods include the generalized minimal residual (GMRES), biconjugate gradient (BiCG), biconjugate gradient stabilized (Bi-CGSTAB), quasi-minimal residual (QMR), conjugate gradient squared (CGS), Chebyshev, and conjugate gradient (CG) techniques.

If the value of $\vec{r}_i$ generated in block 136 of FIG. 13 converges (the 'yes' prong of block 130 is active), the approximate solution $\vec{x}'$ associated with the current time step is computed in block 138 in FIG. 13 (i.e., $A_0 \vec{x}' = \vec{r}_i$ is solved for $\vec{x}'$). Convergence may be defined in any suitable manner and, in one embodiment, is said to occur when the ratio between the magnitude of $\vec{r}_i$ and $\vec{r}_{i+1}$ is less than 0.1%. Mathematically, this may be expressed in the following manner:

$$\frac{\|\vec{r}_{i+1}\|}{\|\vec{r}_i\|} \leq 0.001,$$

where $\|\vec{a}\|$ represents the Euclidean norm of vector $\vec{a}$.

Method steps of FIGS. 10 through 13 may be performed by a computer processor executing instructions organized into program modules. Storage devices suitable for tangibly embodying computer program instructions include all forms of non-volatile memory including, but not limited to: magnetic disks (fixed and floppy); other magnetic media such as tape; optical media such as CD-ROM disks; and semiconductor memory devices such as EPROM and flash devices.

The methods of this invention provide significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention, which is limited only by the following claims.

What is claimed is:

1. In a simulator, a method for solving a system of linear equations representing reservoir conditions, comprising the steps of:

(1) receiving a first signal representing physical characteristics of a reservoir;

(2) obtaining, from the received signal, a residual vector $\vec{r}_0$ representing errors associated with a system of nonlinear equations describing the reservoir;

(3) obtaining, from the received signal, a first matrix $A_0$ representing sensitivity of the residual vector $\vec{r}_0$ to changes in the system of nonlinear equations describing the reservoir;

(4) decomposing matrix $A_0$ in accordance with the following steps:

(a) letting i=0,

(b) if matrix $A_i$ can be efficiently factored exactly, letting n=i, else,     (i) letting $A_i=L_i+A_{i+1}+U_i$ where $L_i$ is a lower block diagonal matrix and $U_i$ is an upper block diagonal matrix, (ii) incrementing i, and
(iii) repeating step (4)(b) for matrix $A_{i+1}$;
(5) generating a second matrix $M_0$ that is an approximation to matrix $A_0$ in accordance with the following steps:
(a) letting $M_n = A_n - D$ where D is a diagonal matrix defined by a specified operation on the matrix given by $$\sum_{i=1}^{n-1} L_{i-1} M_i^{-1} U_{i-1},$$

(b) generating, for $i=(n-1)$ to 1, $M_i = (L_i + M_{i+1})(I + M_{i+1}^{-1} U_i)$, and
(c) letting $M_0 = (L_0 M_1^{-1} + I)(M_1 + U_0)$;
(6) generating, for $k=1$ until convergence, the following values:
(a) $\vec{y} = (L_0 M_1^{-1} + I)^{-1} \vec{r}_{k-1}$,
(b) $\vec{q} = (M_1 + U_0)^{-1} \vec{y}$,
(c) $\vec{z}_i = M_{i+1}^{-1} U_i \vec{q}$ (for $i=1, \ldots, n-1$), (d) $A_0 M_0^{-1} \vec{r}_{k-1} = \vec{y} + D\vec{q} + L_0 \vec{q} - \sum_{i=1}^{n-1} L_i z_i$, and (e) $\vec{r}_{k+1}$ by accelerating the value $A_0 M_0^{-1} \vec{r}_{k-1}$;
(7) generating an approximate solution to the system of linear equations representing reservoir conditions using a value of said $\vec{r}_{k+1}$ that converged; and
(8) generating a second signal representing physical characteristics of the reservoir.

2. The method of claim 1, wherein the physical characteristics comprise reservoir pressure at one or more locations, water fraction at one or more locations, oil fraction at one or more locations, and gas fraction at one or more locations.

3. The method of claim 1, wherein matrix $A_i$ can be efficiently factored exactly when it has a bandwidth of less than or equal to approximately 7.

4. The method of claim 1, wherein the specified operation comprises a column sum operation in accordance with the following:

$$COLSUM\left(\sum_{i=1}^{n-1} L_{i-1} M_i^{-1} U_{i-1}\right).$$

5. The method of claim 1, wherein the specified operation comprises a row sum operation in accordance with the following:

$$ROWSUM\left(\sum_{i=1}^{n-1} L_{i-1} M_i^{-1} U_{i-1}\right).$$

6. The method of claim 1, wherein said accelerating comprises a generalized minimal residual method.

7. A method for solving a system of linear equations representing reservoir conditions, comprising the steps of:
receiving a first signal representing physical characteristics of a reservoir;

obtaining, from the received signal, a residual vector $\vec{r}_0$ representing errors associated with a system of nonlinear equations describing the reservoir;

obtaining, from the received signal, a first matrix $A_0$ representing sensitivity of the residual vector $\vec{r}_0$ to changes in the system of nonlinear equations describing the reservoir; and decomposing matrix $A_0$ in accordance with the following steps:
(a) letting $i=0$,
(b) if matrix $A_i$ can be efficiently factored exactly, letting $n=i$, else,
(i) letting $A_i = L_i + A_{i+1} + U_i$ where $L_i$ is a lower block diagonal matrix and $U_i$ is an upper block diagonal matrix,
(ii) incrementing i, and
(iii) repeating step (b) for matrix $A_{i+1}$.

8. The method of claim 7, further comprising the steps of:
generating a second matrix $M_0$ that is an approximation to matrix $A_0$ in accordance with the following steps:
(a) letting $M_n = A_n - D$ where D is a diagonal matrix defined by a specified operation on the matrix given by $$\sum_{i=1}^{n-1} L_{i-1} M_i^{-1} U_{i-1},$$

(b) generating, for $i=(n-1)$ to 1, $M_i = (L_i + M_{i+1})(I + M_{i+1}^{-1} U_i)$, and
(c) letting $M_0 = (L_0 M_1^{-1} + I)(M_1 + U_0)$.

9. The method of claim 8, further comprising the steps of:
generating, for $k=1$ until convergence, the following values:
(a) $\vec{y} = (L_0 M_1^{-1} + I)^{-1} \vec{r}_{k-1}$,
(b) $\vec{q} = (M_1 + U_0)^{-1} \vec{y}$,
(c) $\vec{z}_i = M_{i+1}^{-1} U_i \vec{q} +$ (for $i=1, \ldots, n-1$), (d) $A_0 M_0^{-1} \vec{r}_{k-1} = \vec{y} + D\vec{q} + L_0 \vec{q} - \sum_{i=1}^{n-1} L_i z_i$, and (e) $\vec{r}_{k+1}$ by accelerating the value $A_0 M_0^{-1} \vec{r}_{k-1}$.

10. The method of claim 7, wherein the physical characteristics comprise reservoir pressure at one or more locations, water fraction at one or more locations, oil fraction at one or more locations, and gas fraction at one or more locations.

11. The method of claim 7, wherein matrix $A_i$ can be efficiently factored exactly when it has a bandwidth of less than or equal to approximately 7.

12. The method of claim 7, wherein the specified operation comprises a column sum operation in accordance with the following:

$$COLSUM\left(\sum_{i=1}^{n-1} L_{i-1} M_i^{-1} U_{i-1}\right).$$

13. The method of claim 7, wherein the specified operation comprises a row sum operation in accordance with the following:

$$ROWSUM\left(\sum_{i=1}^{n-1} L_{i-1} M_i^{-1} U_{i-1}\right).$$

14. The method of claim 9 wherein said accelerating comprises a generalized minimal residual method.

15. A computer program, residing on a computer readable medium, comprising instructions for causing a computer to:

receive a first signal representing physical characteristics of a reservoir;

obtain, from the received signal, a residual vector $\vec{r}_0$ representing errors associated with a system of nonlinear equations describing the reservoir;

obtain, from the received signal, a first matrix $A_0$ representing sensitivity of the residual vector $\vec{r}_0$ to changes in the system of nonlinear equations describing the reservoir; and decompose said matrix $A_0$ in accordance with the following steps:
(a) let i=0,
(b) if matrix $A_i$ can be efficiently factored exactly, let n=i, else,
 (i) let $A_i = L_i + A_{i+}$, $U_i$ where $L_i$ is a lower block diagonal matrix and $U_i$ is an upper block diagonal matrix,
 (ii) increment i, and
 (iii) repeat step (b) for matrix $A_{i+1}$.

16. The computer program of claim 15, further comprising instructions to:

generate a second matrix $M_0$ that is an approximation to matrix $A_0$ in accordance with the following steps:
(a) letting $M_n = A_n - D$ where D is a diagonal matrix defined by a specified operation on the matrix given by $$\sum_{i=1}^{n-1} L_{i-1} M_i^{-1} U_{i-1},$$

(b) generating, for i=(n−1) to 1, $M_i = (L_i + M_{i+1})(I + M_{i+1}^{-1} U_i)$, and
(c) letting $M_0 = (L_0 M_1^{-1} + I)(M_1 + U_0)$.

17. The computer program of claim 16, further comprising instructions to:

generate, for k=1 until convergence, the following values:
(a) $\vec{y} = (L_0 M_1^{-1} + I)^{-1} \vec{r}$,
(b) $\vec{q} = (M_1 + U_0)^{-1} \vec{r}_{k-1}$,
(c) $\vec{z}_i = M_{i+1}^{-1} U_i \vec{q}$ (for i=1, ..., n−1),
(d) $A_0 M_0^{-1} \vec{r}_{k-1} = \vec{y} + D\vec{q} + L_0\vec{q} - \sum_{i=1}^{n-1} L_i z_i$, and
(e) $\vec{r}_{k+1}$ by accelerating the value $A_0 M_0^{-1} \vec{r}_{k-1}$.

18. A simulation apparatus responsive to input data adapted for solving a system of nonlinear equations that represent a particular entity, said simulation apparatus generating a set of simulation results when said system of nonlinear equations are solved, said set of simulation results including one or more parameters which characterize said particular entity comprising:

first means for converting said system of nonlinear equations into a system of linear equations, second means for solving said system of linear equations thereby producing a set of results, said second means for solving said system of linear equations including,
 means for obtaining a matrix $A_0$ from the system of linear equations,
 means for decomposing the matrix $A_0$ until a factorable matrix $M_0$ is obtained, the means for decomposing the matrix $A_0$ until a factorable matrix $M_0$ is obtained including the following steps:
 (a) let i=0,
 (b) if matrix $A_i$ can be efficiently factored exactly, let n=i, else,
  (i) let $A_i = L_i + A_{i+1} + U_i$ where $L_i$ is a lower block diagonal matrix and $U_i$ is an upper block diagonal matrix,
  (ii) increment i, and
  (iii) repeat step (b) for matrix $A_{i+1}$,
 first computing means for computing an approximate factorization of the matrix $M_0$ to produce a particular system of linear equations,
 which are represented by said matrix $M_0$, that approximates said matrix $A_0$, and
 second computing means for computing a solution to said particular system of linear equations using said matrix $M_0$; and third means for solving said system of nonlinear equations by using said set of results produced by said second means.

19. The simulation apparatus of claim 18, wherein the means for decomposing the matrix $A_0$ until a factorable matrix $M_0$ is obtained includes the following additional steps:

means for generating a second matrix $M_0$ that is an approximation to matrix $A_0$ in accordance with the following steps:
(c) letting $M_n = A_n - D$ where D is a diagonal matrix defined by a specified operation on the matrix given by $$\sum_{i=1}^{n-1} L_{i-1} M_i^{-1} U_{i-1},$$

(d) generating, for i=(n−1) to 1, $M_i = (L_i + M_{i+1})(I + M_{i+1}^{-1} U_i)$, and
(e) letting $M_0 = (L_0 M_1^{-1} + I)(M_1 + U_0)$.

20. The simulation apparatus of claim 18, wherein said input data includes reservoir data and said particular entity includes an oil or gas reservoir.

21. The simulation apparatus of claim 19, wherein said third means solves said system of nonlinear equations by using said solution, computed by said second computing means, to said particular system of linear equations which use said matrix $M_0$.

* * * * *